Figure 1:
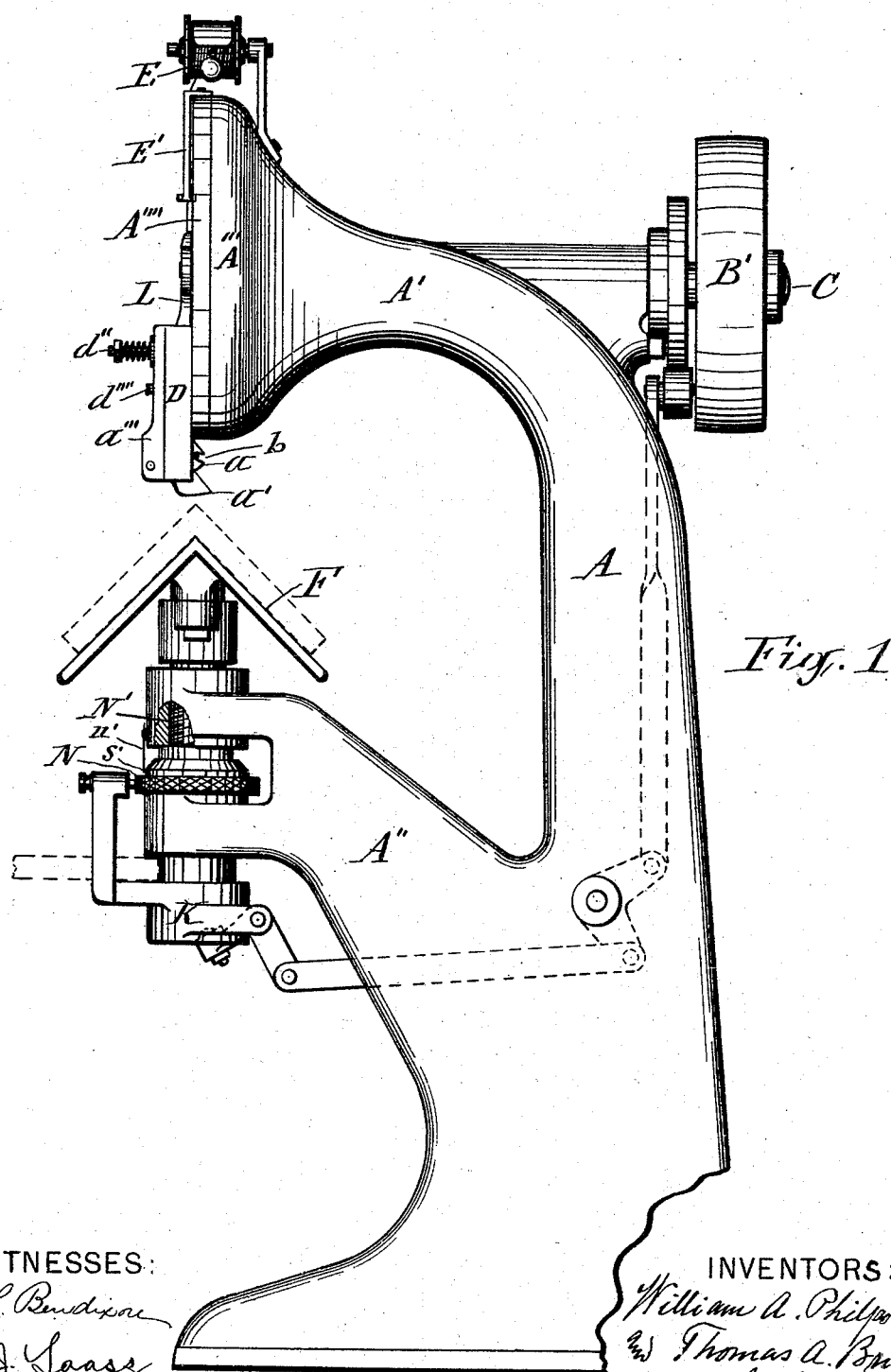

(No Model.) 9 Sheets—Sheet 1.

W. A. PHILPOTT, Jr. & T. A. BRIGGS.
WIRE STITCHING MACHINE.

No. 542,005. Patented July 2, 1895.

WITNESSES:
INVENTORS:

(No Model.) 9 Sheets—Sheet 2.

W. A. PHILPOTT, Jr. & T. A. BRIGGS.
WIRE STITCHING MACHINE.

No. 542,005. Patented July 2, 1895.

WITNESSES:
C. L. Bendixon
J. J. Laasz

INVENTORS:
William A. Philpott, Jr.
Thomas A. Briggs
By E. Laass
their ATTORNEY

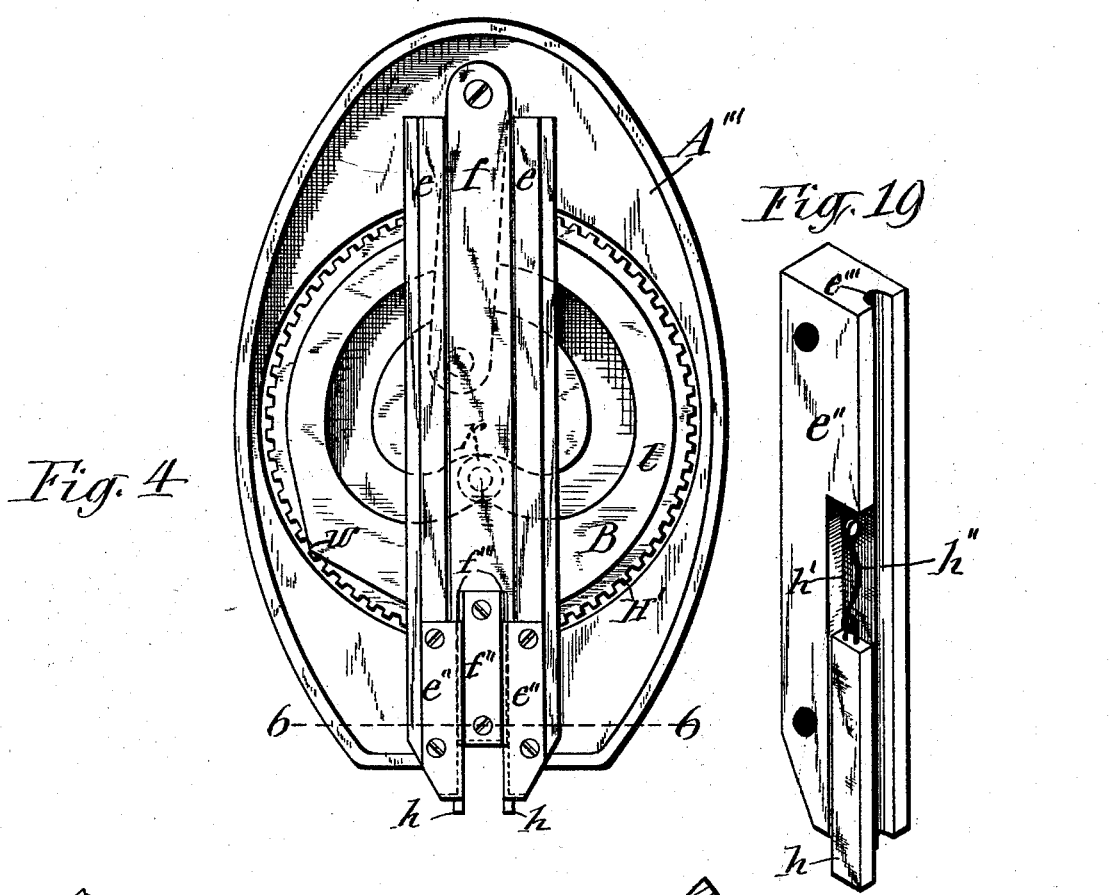
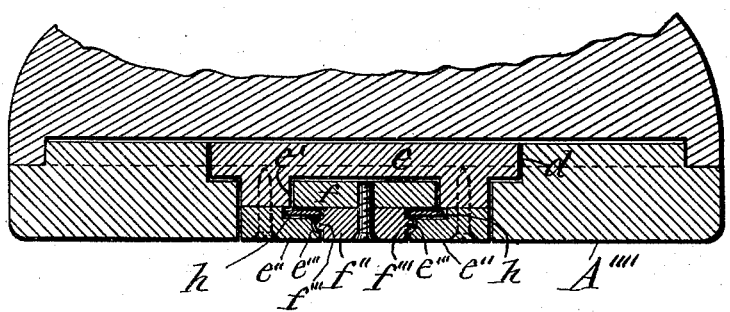

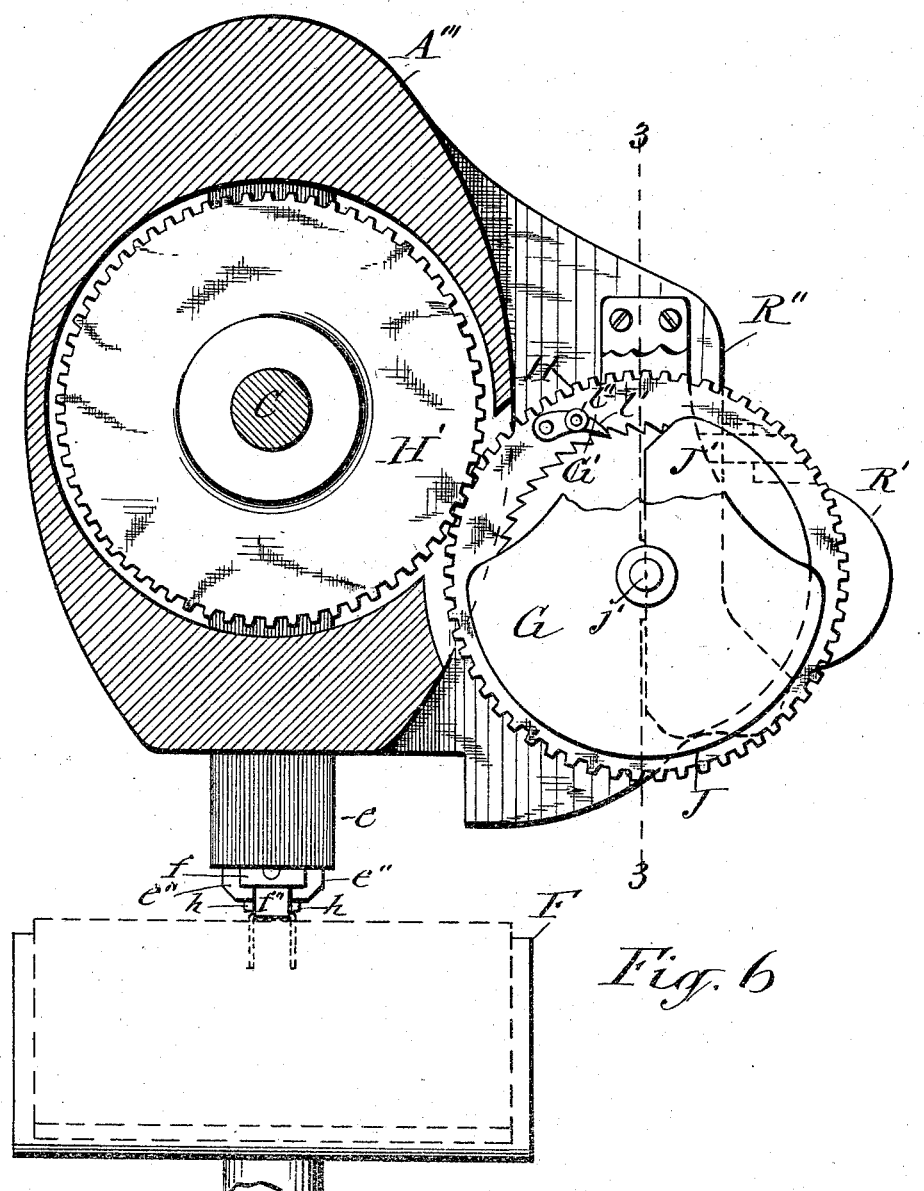

(No Model.) 9 Sheets—Sheet 6.

W. A. PHILPOTT, Jr. & T. A. BRIGGS.
WIRE STITCHING MACHINE.

No. 542,005. Patented July 2, 1895.

WITNESSES:
C. L. Bendixon
J. J. Laass

INVENTORS:
William A. Philpott Jr.
and Thomas A. Briggs
By E. Laass
their ATTORNEY (No Model.) 9 Sheets—Sheet 7.
W. A. PHILPOTT, Jr. & T. A. BRIGGS.
WIRE STITCHING MACHINE.
No. 542,005. Patented July 2, 1895.
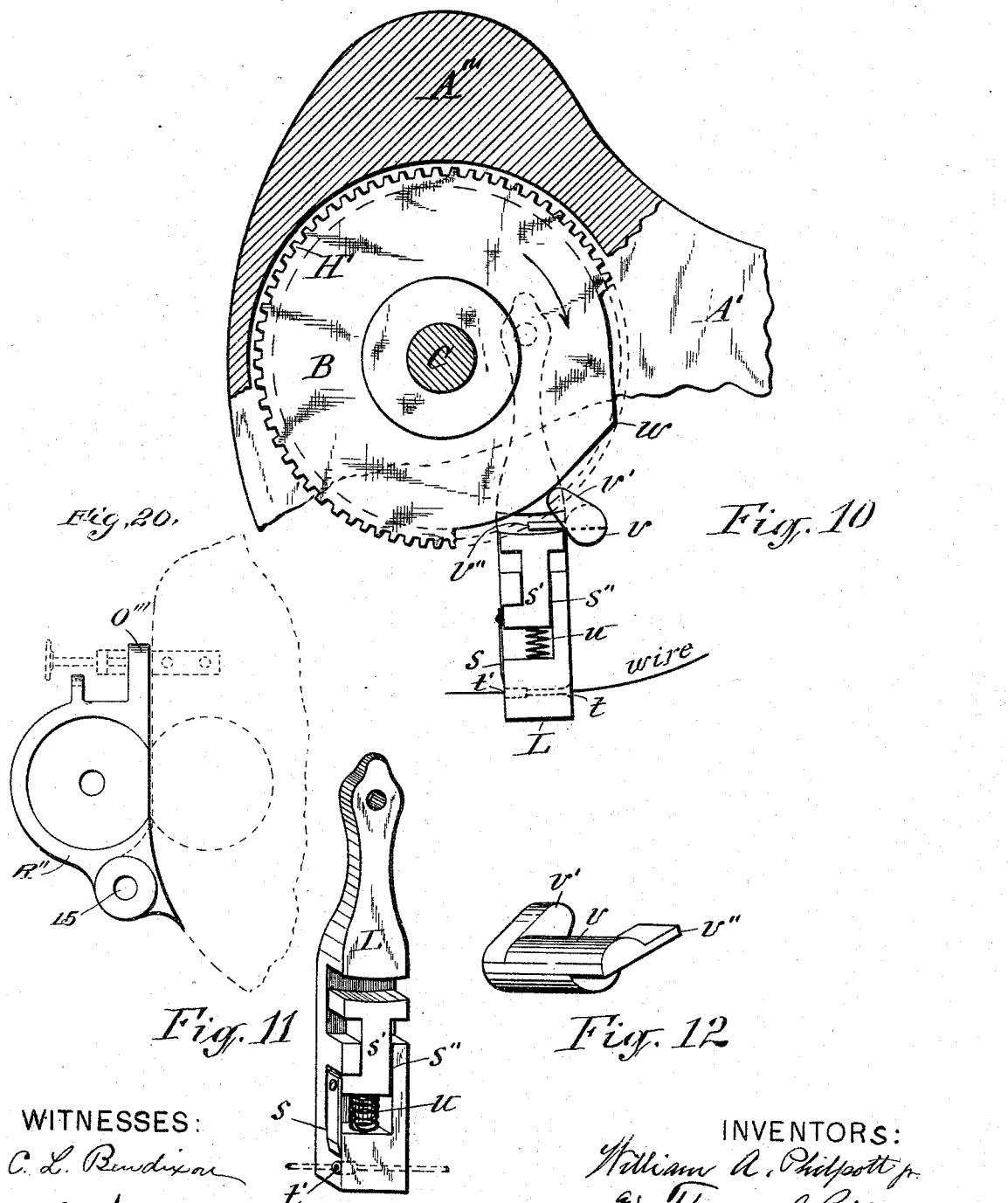
WITNESSES:
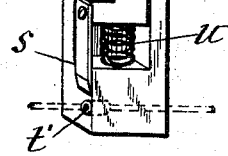
INVENTORS:
William A. Philpott Jr.
and Thomas A. Briggs
By E. Laass
their ATTORNEY (No Model.) 9 Sheets—Sheet 8.

W. A. PHILPOTT, Jr. & T. A. BRIGGS.
WIRE STITCHING MACHINE.

No. 542,005. Patented July 2, 1895.

WITNESSES:
C. L. Bendixon
J. J. Laass

INVENTORS
William A. Philpott Jr.
Thomas A. Briggs
By E. Laass
their ATTORNEY (No Model.) 9 Sheets—Sheet 9.

W. A. PHILPOTT, Jr. & T. A. BRIGGS.
WIRE STITCHING MACHINE.

No. 542,005. Patented July 2, 1895.

WITNESSES:
C. L. Bendixon
J. J. Laass

INVENTORS:
William A. Philpott Jr.
Thomas A. Briggs
By E. Laass
their ATTORNEY

UNITED STATES PATENT OFFICE.

WILLIAM A. PHILPOTT, JR., OF NIAGARA FALLS, NEW YORK, AND THOMAS A. BRIGGS, OF NIAGARA, CANADA.

WIRE-STITCHING MACHINE.

SPECIFICATION forming part of Letters Patent No. 542,005, dated July 2, 1895.

Application filed December 12, 1894. Serial No. 531,568. (No model.)

*To all whom it may concern:*

Be it known that we, WILLIAM A. PHILPOTT, Jr., of Niagara Falls, county of Niagara, and State of New York, and THOMAS A. BRIGGS, of Niagara, in the Province of Ontario, in the Dominion of Canada, have invented new and useful Improvements in Wire-Stitching Machines, of which the following, taken in connection with the accompanying drawings, is a full, clear, and exact description.

This invention relates to the class of machines which are employed for binding books by means of wire staples driven through the book along the line of binding; and it has special reference to the mechanisms for feeding the wire to the machine and cutting the wire into blanks of the requisite lengths and other auxiliary devices connected to the machine; and the invention consists in an improved organization of a machine which is superior in its operation of cutting the blanks from a continuous wire, fed automatically to the machine and forming the staples from the blanks and subsequently driving said staples accurately into the book to be bound, and which machine is equipped with convenient and efficient means for adjusting the wire feeding and cutting mechanism, to form staples of different sizes according to the book to be bound, and also possesses various other advantages over prior machines of this class, all as hereinafter more fully described, and summed up in the claims.

Figure 2:
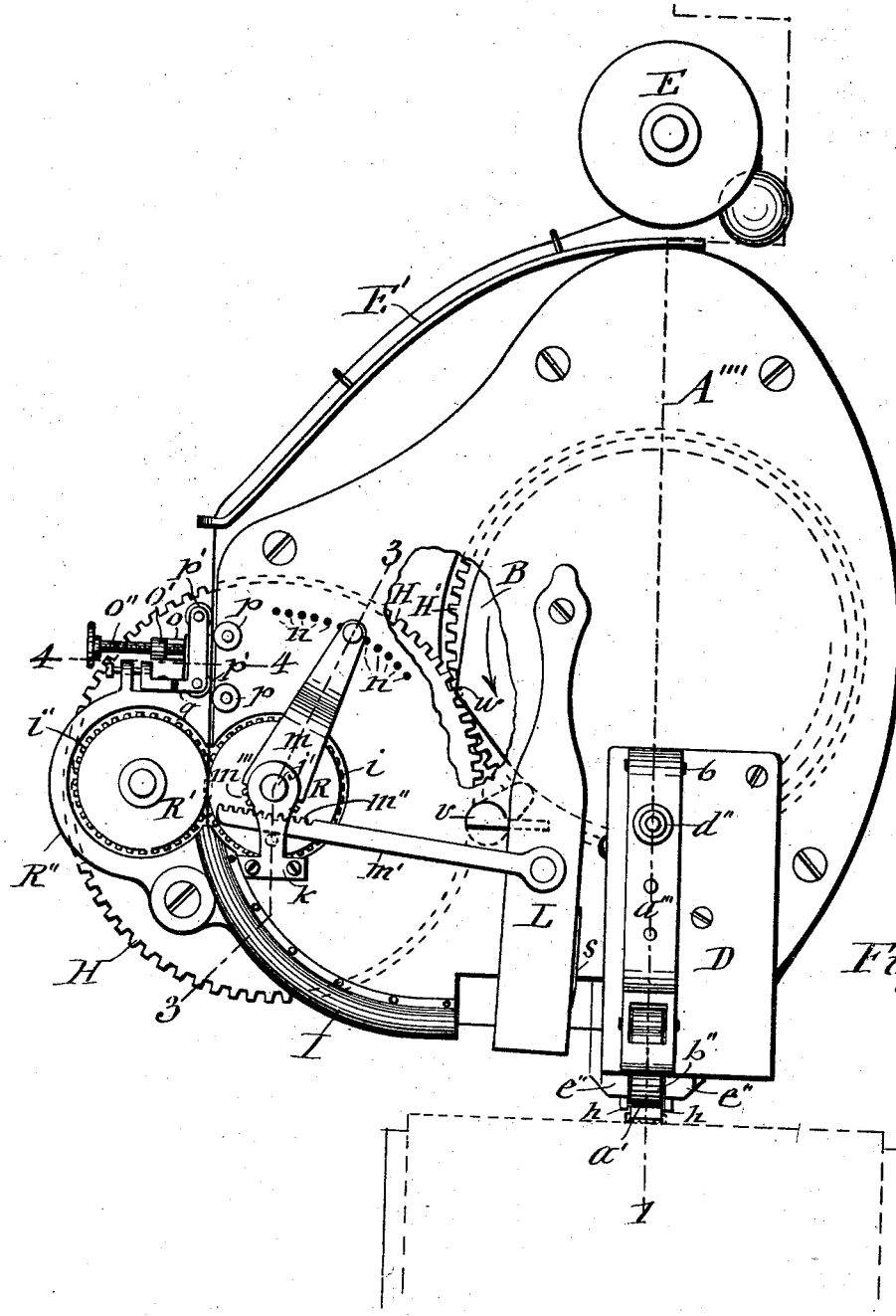
Figure 3:
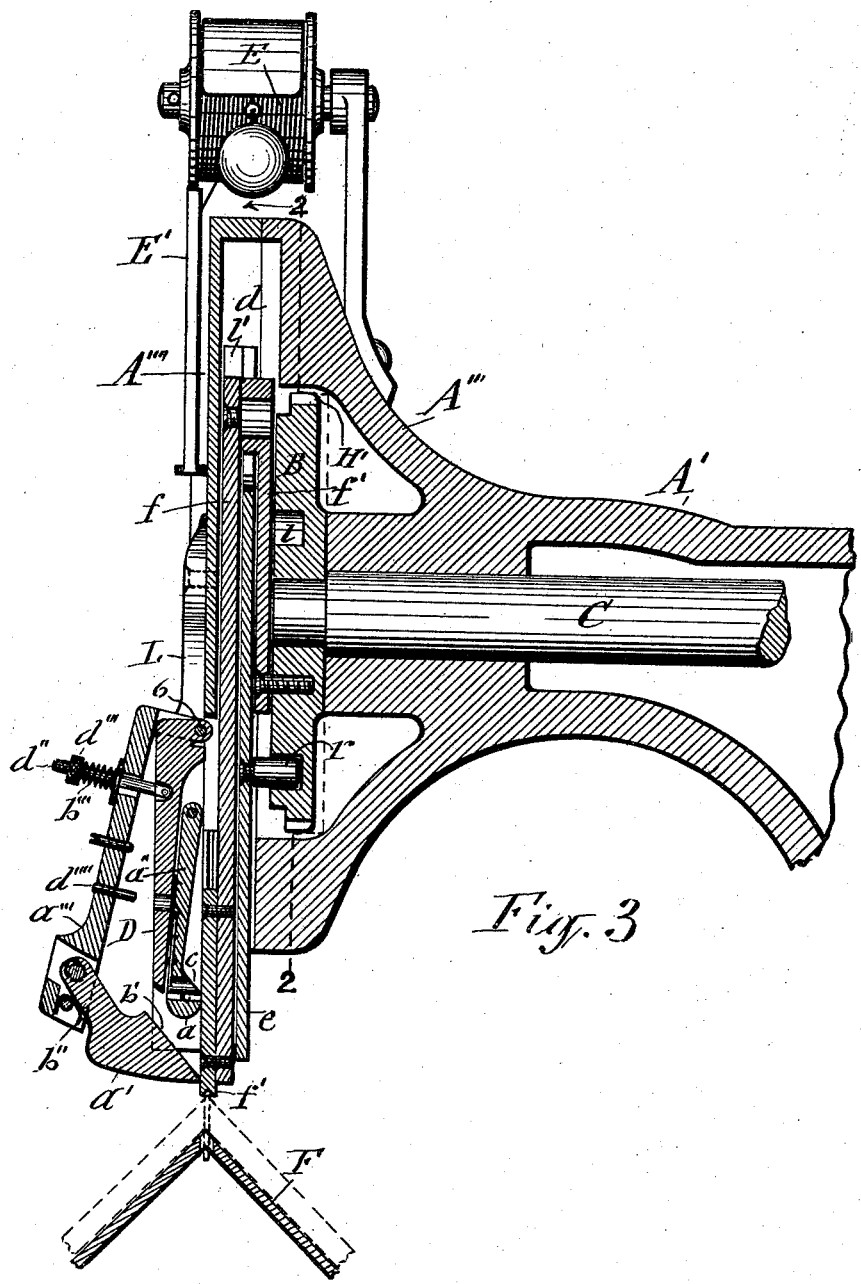
Figures 8, 9:
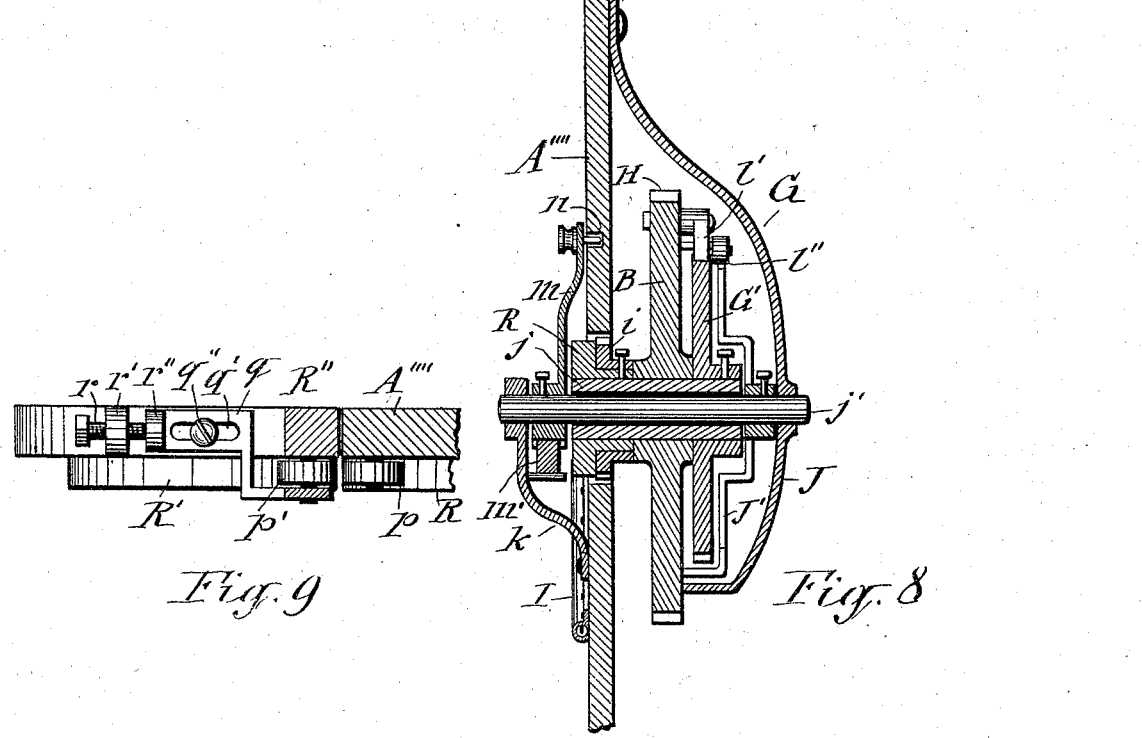
Figure 7:
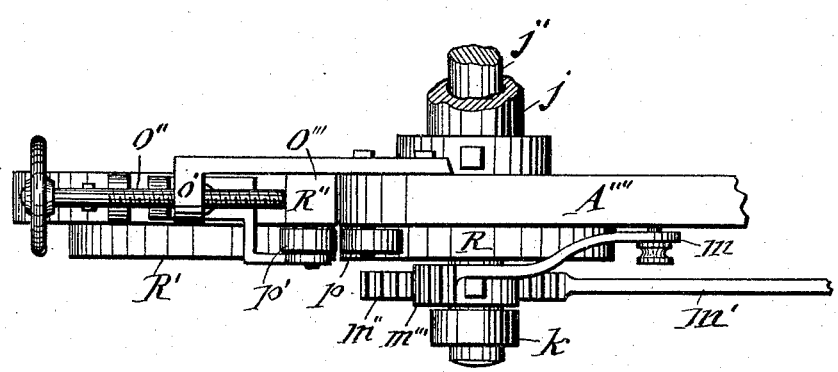
Figure 13:
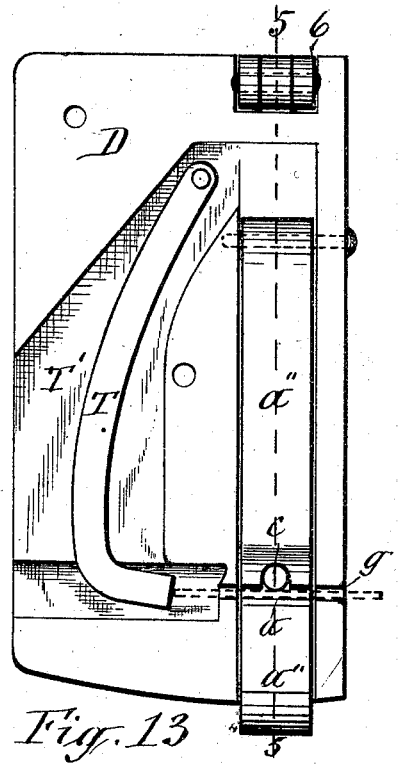
Figure 14:
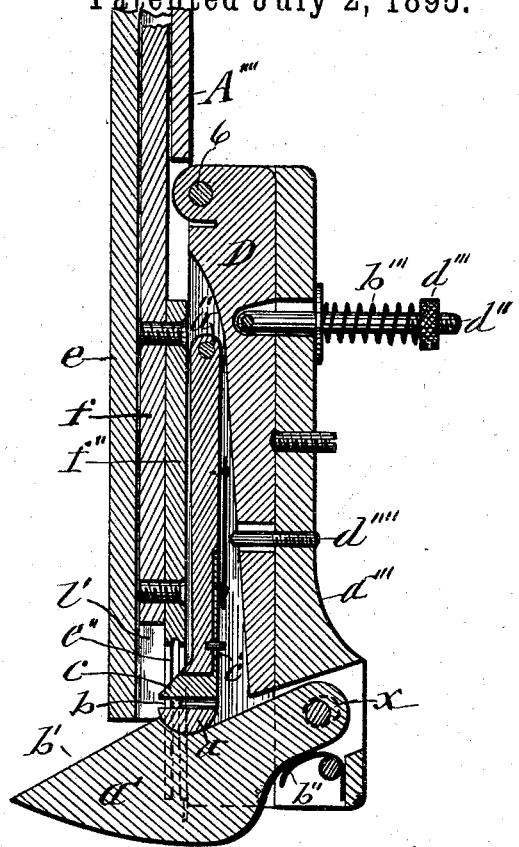
Figure 15:
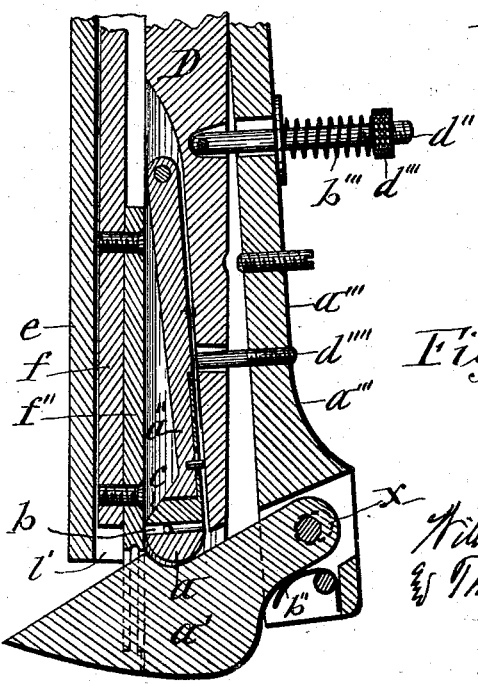
Figure 18:
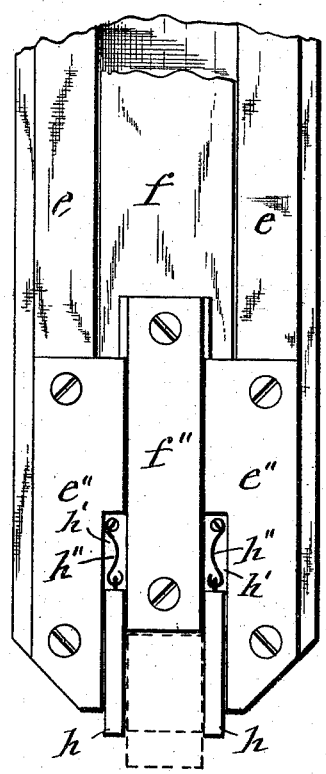
Figure 16:
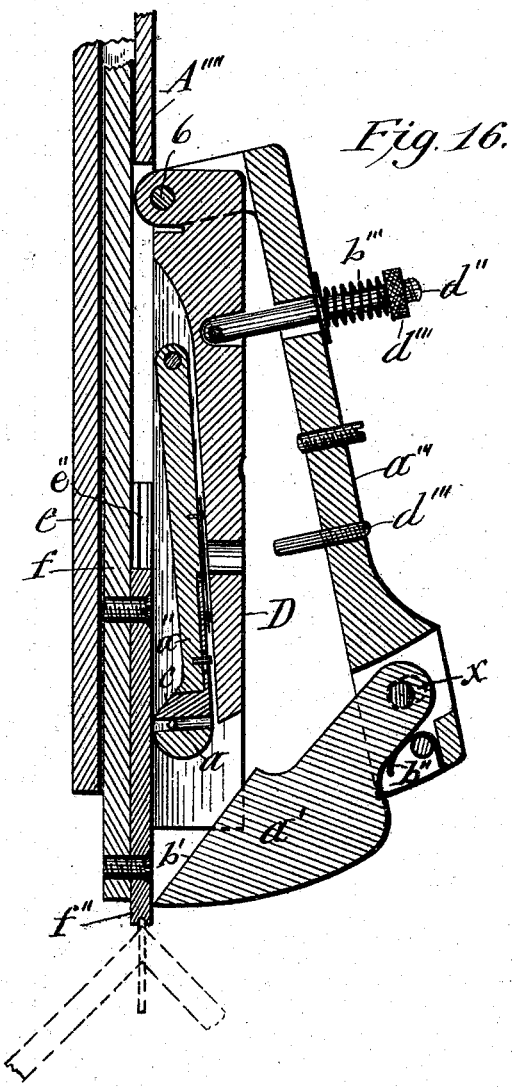
Figure 17:

In the annexed drawings, Figure 1 is a side elevation of a wire-stitching machine embodying our invention. Fig. 2 is an enlarged front elevation of that part of the machine which is above the book-supporting table. Fig. 3 is a vertical transverse section on line 1 1 in Fig. 2. Fig. 4 is a front view of the head of the machine minus the face-plate. Fig. 5 is a horizontal transverse section on line 6 6 in Fig. 4. Fig. 6 is a vertical transverse section on line 2 2 in Fig. 3, viewed in the direction of the arrow. Fig. 7 is a top plan view of that part of the machine to which the wire-feeding mechanism is attached. Fig. 8 is a transverse section of the same on line 3 3 in Figs. 2 and 6. Fig. 9 is an enlarged horizontal transverse section on line 4 4 in Fig. 2. Fig. 10 is a face view of the mechanism for actuating the wire-cutter. Fig. 11 is a perspective view of the cutter-carrier. Fig. 12 is a detached perspective view of the tumbler which transmits motion to the cutter. Fig. 13 is an enlarged inner face view of the case to which the anvil and staple-supporter are connected. Figs. 14, 15, and 16 are vertical transverse sections on line 5 5 in Fig. 13, showing the anvil and staple-supporter in the different positions assumed by them in the operation of the machine. Fig. 17 is an inner face view of the anvil with the wire-blank detainer connected thereto. Fig. 18 is a face view of the staple-former and staple-driver. Fig. 19 is a detached perspective edge view of one of the staple-former plates, showing the attachment of the stop for arresting the inward thrust of the wire blank; and Fig. 20 is a detached face view of the supplemental face-plate of the machine.

Similar letters and figures of reference indicate corresponding parts.

A denotes the standard or main supporting-frame of the machine, which frame is formed with forwardly-extending arms A' A", disposed one above the other and in the same vertical plane.

On the lower arm A" is mounted the table or saddle F for supporting the book to be bound, and to the upper arm A' are connected the mechanisms for forming and driving the wire staples employed for binding the book.

The upper arm A' terminates at its front with a vertically disposed hollow head A''' containing the wheel B, which is fastened to the end of the horizontal shaft C, which extends through the upper arm A' and has fastened to its rear end the driving pulley B'.

The cap or face-plate A'''' of the head A''' is provided in its inner side with a vertical groove *d* in which slides the bar *e*, the lower end of which we designate the staple-former which is provided with a vertical slot *e'*, extending through said end. At opposite sides of this slot are vertical plates *e'' e''* fastened to the bar *e* and provided in their inner edges with longitudinal grooves, as shown at *e'''* in Fig. 5 of the drawings. Said staple former receives intermittent reciprocating motion by a roller r, pivoted to the bar e and projecting into a cam-groove l in the face of the wheel B.

The bar e is formed with a vertical guide l' in which slides another vertical bar f, which is connected to the wheel B by a pitman f', which transmits reciprocating motion to the bar f. The point of connection of said pitman to the wheel B is in such a position in relation to the cam-groove l as to cause the two bars e and f to reciprocate alternately for the purpose hereinafter explained.

The bar f constitutes the staple-driver, which has firmly secured to its lower end a plate f'', the vertical edges of which are formed with tongues f''' by which said driver slides in the grooves e''' of the plates e''.

To the base of the front of the face-plate A'''' is bolted or otherwise securely fastened a case D, having its cavity adjacent to said face-plate. In said cavity is supported the laterally-movable anvil a, preferably formed on the lower end of a bar or hanger a'', which is pivoted at its upper end to the case. Said anvil projects from the rear of the hanger and is held normally in the paths of the staple-former e and staple-driver f. The top of said projecting anvil is beveled or wedge-shaped so as to cause the descending staple-driver to force the anvil out of its way. The anvil a is provided with a transverse slot b for the reception of the wire blank from which the staple is to be formed, said blank being fed into a horizontal groove g in the case D, as shown more clearly in Fig. 13 of the drawings.

Immediately beneath the anvil a is a staple-supporter a', which is supported yieldingly in both vertical and lateral directions to yield to the downward movement of the staple-driver f and to the contact with the book to be bound. This staple-supporter a' we preferably pivot to the lower end of an arm a''', which in turn is hinged to the top of the case D at 6 and is provided in its lower end with a slot x, through which the pivot-pin of the staple-supporter a' passes, said slot allowing said staple-supporter to move laterally independent of the arm a'''.

A suitable spring b'' supports the staple-supporter a' in its normal position, and the arm a''' is forced toward the case D, so as to carry the staple-supporter into the path of the staple-driver f by the expansive force of a spiral spring b''' surrounding the outer end of a bolt d'', which passes through an aperture in the arm a''' and is fastened to the case D, said spring bearing at one end on a nut d''' on the outer end of the bolt and at the opposite end on a washer seated on the exterior of the arm.

A set-screw d'''' passes through the arm a''' and is adjustably connected thereto to cause it to project from the inner side thereof, so that, when the staple-driver is raised to its utmost elevation and the arm a''' is in its normal position, the aforesaid set-screw enters an orifice in the case D and pushes the anvil a to its requisite position for carrying the next wire blank under the staple former and driver.

The operation of the described anvil and staple-supporter is as follows: The staple-driver f in descending to drive the staple into the book supported on the table F, forces the anvil a out of the way and into the case D sufficiently to bring the slot b of said anvil in range with the wire-guiding groove g in the case and thus permit the next wire blank to enter the slot b, as illustrated in Figs. 15 and 16 of the drawings. The staple-driver then rises and allows the anvil a to move back to its normal position, as shown in Fig. 14 of the drawings, and in this movement said anvil carries the wire blank to a position directly under and parallel with the bottom edges of the staple-forming plates e'' e'', which edges are provided with grooves by which to obtain a hold on the wire blank. The staple-former then descends and by straddling the anvil a it bends down the end portions of the blank and thereby forms the staple. As soon as this is effected the driver f descends, and in pushing the anvil a out of the way the staple becomes released from said anvil and is forced down into the book supported on the table F. In this operation the grooved edges of the plates e'' e'' serve to hold the shanks of the staple closely to the sides of the staple-supporter a' and guide said shanks so as to prevent them from bending. In this driving operation the staple-supporter yields to the downward pressure of the driver, as represented in Fig. 16 of the drawings.

In order to prevent excessive inward thrust of the wire blank under the staple-driver and former by the released anvil a, we connect to the plates e'' e'' vertically movable stops h, preferably of the form of metal strips disposed immediately back of the staple-guiding grooves of the plates e'' e'' and sliding in vertical grooves h' in said plates, as shown in Fig. 19 of the drawings. A suitable spring h'' connects the metal strip h to the plate e'' and holds the strip normally in a position to project below the bottom of the plate and arrest the lateral thrust of the wire blank imparted to it by the anvil a. In the descent of the staple-former the strip or stops h readily yield to the contact with the book so as to obviate injuring the same. To hold the wire blank in position in the slot b of the anvil a until the staple-former has obtained a proper hold on said blank, we place horizontally across the slot b a wire-detaining finger c, which extends through to the back of the hanger a'' and is movable vertically, and formed cylindrical or with a rounded or beveled under side to allow the blank to pass under it. This finger we preferably connect to the lower end of a plate c', which slides longitudinally in a vertical guide-groove in the outer side of the hanger a'' and receives downward pressure by a spring c''.

E represents the spool upon which is wound the wire from which the staples are formed.

Said spool is preferably mounted on the head A'''. A guide E' conducts the wire to the feeding mechanism which is operated automatically and in harmony with the operation of the staple-former and staple-driver. Said feeding mechanism consists of two rollers R R', disposed in the same plane and with their peripheries in sufficient proximity to each other to grip the wire passing between them. Said rollers have affixed to them intermeshing gears $i\ i'$ by which they are caused to rotate in unison. The gear-wheel $i$ is fastened to a hollow shaft $j$, which is journaled on a supporting-shaft $j'$, passing longitudinally through said hollow shaft and mounted at one end in a suitable bearing on a bracket $k$, secured to a lateral extension of the face-plate A'''' and journaled at the opposite end in a bearing on a bracket G fastened to the back of said plate-extension, as more clearly shown in Fig. 8 of the drawings. To the hollow shaft is also firmly secured the ratchet-wheel G', and on the shaft $j'$ is loosely mounted the gear-wheel H, meshing with a gear H', which is either rigidly attached to or formed integral with the cam-wheel B and thus partakes motion from the same. To the gear H is connected a pawl $l'$, which by engagement with the ratchet-wheel G' transmits rotary motion to the feed-roller R, which by aid of the companion roller R' draws along the wire. A guide I conducts the wire from said feed-rollers to the cutter, which severs the wire and forms the blanks for the staples as hereinafter described.

In order to allow the wire to be fed at intervals and periods of different lengths and thus form blanks for different sizes of staples to be formed, we employ a suitable automatic feed-regulating device for controlling the feeding mechanism. This feed-regulating device we prefer to form as follows: The rear bracket G is either formed with or has rigidly attached to it a shield J having a flange which covers about one-half of the peripheral face of the ratchet-wheel G', and to the supporting shaft $j'$ is fastened another shield J', which also has a flange extending across and about half-way around the periphery of the ratchet-wheel, as more clearly shown in Figs. 6 and 8 of the drawings. The pawl $l'$ has pivoted to its side a roller $l''$ or is otherwise provided with a suitable projection which during the rotation of the gear-wheel H mounts the aforesaid flanges of the shields and is thereby lifted out of engagement with the ratchet-wheel G'.

It will be observed that by turning the shield J' on its axis so as to cover a greater or less portion of the periphery of the ratchet-wheel not covered by the stationary shield J said ratchet-wheel is permitted to be turned a corresponding shorter or longer distance by the pawl and the motion of the feed-rollers R R' is varied accordingly.

For adjusting the adjustable shield and retaining the same in its desired position we attach to the front end of the shaft $j'$ a lever $m$ by which to turn said shaft, and in connection with said lever we employ a graduated segmental scale S, which is concentric to the shaft $j'$ and traversed by the free end of the lever. Said scale is formed of a segmental row of sockets $n\ n$ in the face-plate A'''', and the free end of the lever has projecting from it a spur adapted to enter the sockets. The lever which also serves as an indicator may be made flexible to automatically force the spur into the socket or the spur may be connected to the lever movably to and from the scale. This scale is made to correspond to a scale S' on the nut N by which the book-supporting table F is raised and lowered to allow the staple-former and staple-driver to operate on books of different thicknesses; said table being mounted on a screw N' passing through the nut N which is seated in a recess in the arm A'' and is thereby supported, as shown in Fig. 1 of the drawings. An indicator $n'$ attached to the arm A'' points to the scale S'.

The elevation of the table required for operating on the book to be placed thereon is determined by inserting the edge of the book between the under side of the arm A'' and a collar K attached to the lower end of the screw and then turning the nut N until the inserted edge of the book is in intimate contact with the said arm and collar. Then by setting the lever $m$ to a socket $n$ opposite a number corresponding to that pointed at on the scale S' by the indicator $n'$, the before-described movable shield J' is set so as to regulate the wire-feeding mechanism for forming staples of the requisite lengths for binding the book.

In order to facilitate the operation of introducing a newly-supplied wire between the feed-rollers R R', we pivot the roller R' to a supplemental face-plate R'', the shape of which is more clearly shown in Fig. 20 of the drawings, and which is hinged at 15 to the lateral extension of the face-plate A'''' and is in the same plane therewith. Said supplemental plate can be swung away from the face-plate to separate the two rollers sufficiently to allow the wire to be easily placed between them.

For locking the supplemental plate on the face-plate to retain the feed-rollers in their requisite proximity to each other to grip the wire we prefer to hinge to the face-plate a metal strap $o$, terminating at its free end with a laterally-projecting offset $o'$, provided with a screw-threaded eye, through which passes a set-screw $o''$, bearing on a lug $o'''$, formed on the plate R'', as best seen in Fig. 7 of the drawings.

$p\ p'$ represent two pairs of rollers which straighten the wire and guide it to the feed-rollers R R'. One pair $p\ p$ of said guide-rollers is pivoted to the face-plate A'''' and the other pair $p'\ p'$ is pivoted to a bracket $q$, which is mounted on the plate R'' and is adjustable toward and from the rollers $p\ p$ to regulate the distance between the two pairs. Said adjustability we preferably attain by providing the horizontal foot of the bracket with a longitudinal slot $q'$ for the reception of the screw $q''$, by which the bracket is clamped on the plate R'', as shown in Figs. 2 and 9 of the drawings. To render the adjustment more accurate, we employ a set-screw $r$, which passes through a screw-threaded eye in a lug $r'$ formed on the plate R'', said screw bearing on a similar lug $r''$, formed on the bracket $g$.

$s$ denotes the cutter which severs the wire and forms therefrom the blanks to be bent into the form of staples. In order to permit said cutter to be adjusted in its position to leave the blank lying with the center of its length central on the anvil $a$, we place said cutter on a suitable carrier L, which is connected to the face-plate A'''' and adjustable in relation to its distance from the anvil $a$. To effect this adjustment of the cutter-carrier simultaneously with the hereinbefore described adjustment of the stop-motion of the feeding mechanism, we pivot the carrier L in a suspended position to the face-plate A'''' and connect it to the feed-regulating lever $m$ by means of a rod $m'$, connected at one end to the carrier L and having on its opposite end a rack $m''$ engaging a toothed segment $m'''$, which is concentric with the shaft $j'$ and either attached to or formed on the lever $m$ to turn therewith.

The lower portion of the carrier L has extending horizontally through it a wire-guiding channel $t$, in one end of which is fastened the stationary cutter $t'$, preferably of the form of a tubular plug, which is screw-threaded externally and inserted into a correspondingly screw-threaded socket in the carrier and in line with the channel $t$. The outer face of said plug is flush with the exterior of the carrier L to allow the movable cutter to pass across said stationary cutter.

The object of the described construction and attachment of the stationary cutter is to allow it to be removed when required for repairs or renewal.

The movable cutter $s$ is attached to a plunger $s'$, sliding in a vertical guide $s''$ formed in the carrier L, as shown in Figs. 10 and 11 of the drawings. Said plunger is intermittently depressed by means of a tumbler $v$, pivoted in the face-plate A'''' and provided at its inner end with a lug $v'$, which is in the path of a cam $w$ formed or attached to a rotary wheel, preferably the wheel B, as shown in Fig. 10 of the drawings, by which cam the tumbler is partially turned in one direction on its axis during the rotation of the wheel. The outer end of the tumbler has projecting from it a finger $v''$ by which it bears on top of the plunger $s'$. The form of the tumbler is clearly illustrated in Fig. 12 of the drawings. The employment of the aforesaid tumbler is resorted to for the purpose of transmitting motion of the cam $w$ at one side of the face-plate A'''' to the knife-carrying plunger situated at the opposite side of said plate.

By operating the tumbler $v$ by the cam $w$, attached to the wheel B, which actuates the wire-feeding mechanism, staple-former, and staple-driver, the cutter $s$ is caused to operate positively in unison with the aforesaid mechanism and parts deriving motion from said wheel.

To prevent the wire blank from springing away from the side of the cutter at the moment said blank is severed from the wire, we employ a yielding detent T in the path of the end of the wire so as to come in contact therewith and hold the blank back to abut with its opposite end against the side of the cutter $s$. Said detent we preferably form of a prolonged metal plate which is pivoted in a suspended position in a recess T' in the case D and having its lower end in the path of the wire, as shown in Fig. 13 of the drawings.

What we claim as our invention is—

1. In combination with the vertically movable book-supporting table, screw and nut for raising and lowering the same, anvil, staple-former and staple-driver over said table, wire-feeding mechanism, and a wire-cutter supported movably toward and from said anvil, a feed-regulating device controlling the feed mechanism, a graduated scale indicating the elevation of the aforesaid table, and a corresponding scale indicating the effective position of the aforesaid feed-regulating device as and for the purpose set forth.

2. In combination with the anvil, staple-former, staple-driver and their actuating wheel, wire-feeding rollers, a wire-cutter connected to a carrier sustained movably toward and from said anvil, a loosely mounted gear wheel receiving motion from the aforesaid actuating wheel, a ratchet-wheel fastened to the axis of one of the feeding-rollers, a pawl connected to the aforesaid gear-wheel, a stationary shield covering a portion of the periphery of the ratchet-wheel, a revoluble shield concentric to the ratchet-wheel, a lever secured to the axis of the revoluble shield to adjust the same to cover a greater or less number of ratchet-teeth, and a rod connecting said lever with the cutter-carrier to adjust the latter simultaneously with the aforesaid shield.

3. In combination with the anvil, staple-former, staple-driver and actuating wheel of said driver, wire-feeding rollers geared to rotate in unison, a ratchet-wheel fastened to the axis of one of said rollers, a shaft extending longitudinally through said roller-shaft and revoluble independently thereof, a rotary gear-wheel mounted loosely on said shaft, a pawl on said gear-wheel, a stationary shield covering a part of the periphery of the ratchet-wheel, a shield fastened to the aforesaid internal shaft and extending across a portion of the periphery of the ratchet-wheel, a lever fixed to the latter shaft, a graduated scale traversed by said lever and provided with locking devices for retaining the lever, a toothed segment turning with the lever, a cutter-carrier movable toward and from the anvil, and a rod connected at one end to the cutter-carrier and provided at the opposite end with a rack engaging the segment as set forth.

4. The combination with the face-plate and feed-roller and guide-rollers pivoted to said plate, a supplemental plate connected to the edge of said face-plate adjustably toward and from the same, a co-operating feed-roller pivoted to the supplemental plate, a bracket mounted on the latter adjustably toward and from the aforesaid guide-rollers, and co-operating guide-rollers pivoted to said bracket as set forth.

5. In combination with the face-plate —A''''— wire-cutter —s— and wheel —B— respectively in front and rear of said plate and the wire-feeding mechanism, staple-former and staple-driver all actuated by said wheel, the cam —w— on the aforesaid wheel, and the tumbler —v— pivoted in the face-plate and provided with the lug —v'— in the path of the aforesaid cam and with the finger —v''— for depressing the cutter all combined to definitely operate in unison as set forth.

6. In combination with the face-plate and a rotary wheel, a cam fixed to said wheel, a carrier secured to the exterior of said face-plate, a wire-guide extending through the lower portion of the carrier, a stationary cutter in one end of said guide, a vertically movable plunger carried on the carrier, a cutter attached to said plunger, a spring sustaining the plunger in its elevated position, and a tumbler pivoted in the face-plate and provided at its inner end with a lug in the path of the aforesaid cam, and a finger projecting from the outer end of the tumbler and depressing the plunger by force derived from the engagement of the lug with the cam as set forth.

7. In combination with the book-supporting table, staple-former staple-driver and anvil swinging in a plane at right angles to the movement of said former and driver, vertically yielding stops connected to the staple-former and projecting normally beneath the same immediately back of the staple-guide of the driver to arrest at said guide the wire-blank thrust thereto by the swinging anvil as set forth.

8. In combination with the wire-feeding mechanism, wire-cutter, staple-former and staple-driver, a yielding detent in the path of the end of the wire to hold the opposite end of the severed wire-blank against the side of the cutter and in its central position in relation to the former and driver as set forth.

9. In combination with the staple-former and staple-driver, the case —D—, hanger —a''— pivoted to said case, anvil —a— formed on the lower end of said hanger, the arm —a'''— hinged to the top of the case, the staple-supporter —a'— pivoted to the lower end of said arm, the springs —b''— —b'''— forcing respectively said staple-supporter and aforesaid arm toward the case, and the set-screw —d''''— attached to said arm and passing through the case to push the anvil to a position to carry the wire blank under the staple-former and driver as set forth.

In testimony whereof we have hereunto signed our names this 5th day of October, 1894.

WILLIAM A. PHILPOTT, JR. [L. S.]
  THOMAS A. BRIGGS. [L. S.]

Witnesses:
 G. M. TUTTLE,
 FREDK. LEUPPIE.